United States Patent
Kubik

[11] Patent Number: 6,100,508
[45] Date of Patent: Aug. 8, 2000

[54] HEATED ROLLER

[75] Inventor: Klaus Kubik, Tönisvorst, Germany

[73] Assignee: Eduard Kusters Maschinenfabrik GmbH & Co. KG, Krefeld, Germany

[21] Appl. No.: 09/242,521

[22] PCT Filed: Apr. 7, 1997

[86] PCT No.: PCT/DE97/00703

§ 371 Date: May 7, 1999

§ 102(e) Date: May 7, 1999

[87] PCT Pub. No.: WO98/07998

PCT Pub. Date: Feb. 26, 1998

[30] Foreign Application Priority Data

Aug. 17, 1996 [DE] Germany ............. 296 14 264 U

[51] Int. Cl.[7] .................. F28F 5/02; D21G 1/00
[52] U.S. Cl. ........................... 219/469; 492/46
[58] Field of Search ................. 219/216, 469; 100/328, 334–336; 162/206; 165/90; 492/46

[56] References Cited

U.S. PATENT DOCUMENTS

| 3,562,489 | 2/1971 | Lenk ........................... 219/469 |
| 4,011,641 | 3/1977 | Kitano et al. ................. 219/469 |
| 4,955,433 | 9/1990 | Zaoralek ...................... 165/90 |
| 5,054,543 | 10/1991 | Thomas et al. . | |
| 5,171,404 | 12/1992 | Ellis et al. . | |
| 5,252,185 | 10/1993 | Ellis et al. ................... 162/206 |
| 5,397,290 | 3/1995 | Hellenthal ................... 492/46 |
| 5,596,397 | 1/1997 | Shimada et al. ............. 219/469 |
| 5,611,394 | 3/1997 | Mizuta et al. ............... 219/469 |
| 5,773,796 | 6/1998 | Singer et al. ............... 219/216 |
| 5,895,598 | 4/1999 | Kitano et al. .............. 219/469 |
| 5,967,958 | 10/1999 | Borkenhagen et al. ........ 492/46 |

FOREIGN PATENT DOCUMENTS

| 1544792 | 10/1968 | France . |
| 29 29 620 | 2/1981 | Germany . |
| 90 14 117 | 2/1991 | Germany . |
| 90 16 548 | 2/1991 | Germany . |
| 40 36 121 | 1/1992 | Germany . |
| 40 33 986 | 2/1992 | Germany . |

OTHER PUBLICATIONS

F. Wagner, "Die Elektrische Walzenheizung", die elektrische ausrustung, No. 2, Apr. 20, 1996. Cited in Specification.

*Primary Examiner*—Joseph Pelham
*Attorney, Agent, or Firm*—Kenyon & Kenyon

[57] ABSTRACT

A roller which can be heated, has a cylindrical roller body which turns about its axis and has a first hollow arrangement and a second hollow arrangement in the form of several channels closed on their ends which run parallel to the axis and which are separated from one another and are of uniform volume. In the first arrangement, an electric radiant heating device is arranged on the roller along its longitudinal direction at least over the working area of the roller. The longitudinal channels of the second hollow arrangement are partly filled with a liquid heated to vaporizing by the heating device.

9 Claims, 3 Drawing Sheets

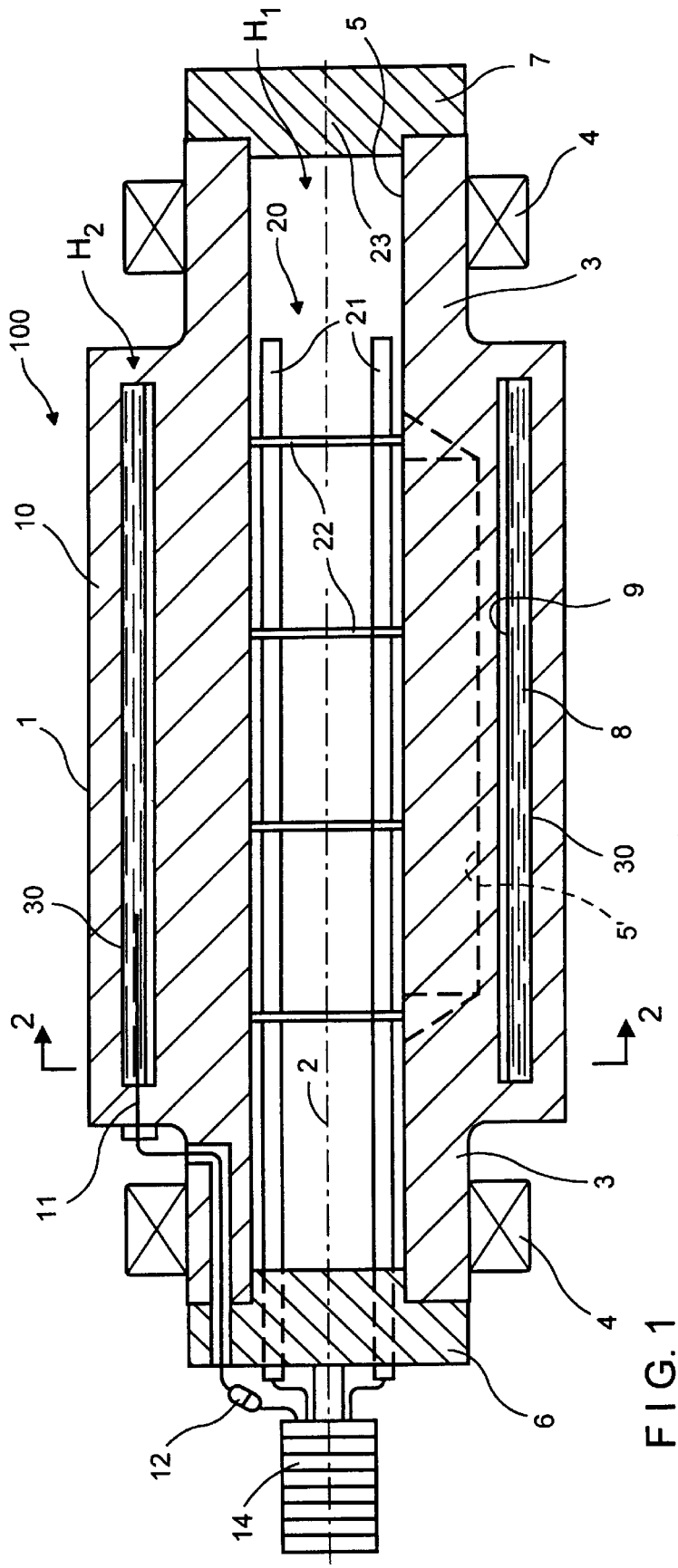

HEATED ROLLER

BACKGROUND OF THE INVENTION

The present invention relates to a heated roller of the type in which the heated roller has a cylindrical roller body that rotates around its axis and has an outer cylindrical surface that serves as the roller working surface. The roller has a first inside cavity arrangement as well as a second cavity arrangement in the form of several elongated axis-parallel channels, separate from one another, that are evenly distributed over the circumference of the roller body and which are sealed at their ends.

Axis-parallel channels have long been known in connection with heating of rollers, e.g. from DE-GM (utility model) 90 14 117, where they don't form a closed system, however, but rather have a heat carrier fluid flowing through them which is heated and pumped in circulation outside the roller.

In German Patent 40 33 986 A1, no heating elements are arranged in a central bore of the roller body, and rod-shaped electrical heating elements are arranged in the peripheral channels, which are partially filled with a convection fluid capable of boiling.

Elongated axis-parallel channels can be produced in the roller body using known means, with relatively little effort, and leave the roller body essentially unimpaired in its stability. The term "elongated channels" in this contexts means that the cross-sectional area of the channel is not important and that the length of the channels is a multiple, e.g. 20 to 150 times, of the cross-sectional dimension. In practice, these are so-called peripheral bores made in the roller body close to its outside circumference. These bores contain the heating elements, the connections of which must be brought out at the ends. This requires complicated seals, because of the high pressures in the bores. Because of the closeness of the heating elements to the roller circumference, the temperature distribution in the circumference direction of the roller circumference is frequently uneven.

SUMMARY OF THE INVENTION

The invention is directed to the problem of structuring a roller of this general type in such a way that the effort and expense involved in its production are reduced and its properties in operation are improved.

The apparatus of the invention provides for a heated roller having a first inner cavity and a second cavity arrangement, located radially exteriorly of the first inner cavity, and taking the form of several elongated axis-parallel channels distributed beneath and evenly along the outer working surface of the roller. An electrical radiant heating system is located in the first cavity, and extends along the length of the roller.

In the invention, the elongated channels are individually and partially filled with water, and then sealed to be pressure-tight. The air is evacuated from the channels after they have been charged with water, since otherwise air plugs would form in the channels, preventing condensation of the steam. If a temperature reduction occurs at a location of a bore during operation, the steam located there, in the free space of the cavity not filled by the water, will condense at that location, thereby causing condensation heating which immediately brings the location in question back to the temperature prevailing in the surroundings. Therefore automatic temperature equalization over the surface of the roller body takes place.

Because of the arrangement of the radiant heating system in the first inside cavity, heat distribution at the roller circumference (i.e., the outer cylindrical working surface of the roller body) becomes more uniform. The sealing expense and effort for bringing the electrical connections out at the channels is also eliminated, since these no longer contain any heating elements.

According to one embodiment of the invention, the channels are sealed at their ends by plugs that have been inserted into the channels. Alternatively, the channels can be sealed towards the outside of at least one end of the roller body by a common sealing ring.

Since the sealing rings and the plugs must be leak-proof and able to withstand high pressures, if necessary, they are preferably welded along their join zones, i.e. along the two lengthwise edges of the sealing rings and at the circumference of the plugs, respectively.

In the preferred exemplary embodiment of the invention, the cylindrical roller body has roller journals attached to it. These can be structured in such a way that they cover the join zones, so that even if a weld seam bursts, the damage location is covered and an explosion-like discharge of parts, under the high steam pressure, is avoided.

The roller journal can include an end surface which is perpendicular to the axis of the roller and which comes to rest against the face of the roller body, as well as a cylindrical centering projection for engaging into the end of the cylindrical roller body.

The radiant heating system in the first center cavity coaxial to the axis can rotate with the roller body and can be supplied with energy via at least one rotary connection, in the manner as has been described in the article by Wagner "Die elektrische Walzenheizung" [Electrical Roller Heating] in "Die elektrische Ausrüstung" [Electrical Equipment] (Vogel-Verlag Würzburg) No. 2 dated Apr. 20, 1966.

In an alternate embodiment, the radiant heating system is arranged not to rotate, which eliminates the need for a rotary connection, and is mounted in the coaxial center cavity which rotates around it.

BRIEF DESCRIPTION OF THE DRAWINGS

The drawing shows exemplary embodiments of the invention in schematic form. In particular:

FIG. 1 is a lengthwise cross-sectional view taken through the axis of a heated roller constructed according to the principles of the invention;

FIG. 2 shows a partial cross-section taken along the line II—II in FIG. 1;

DETAILED DESCRIPTION

Figure 3:
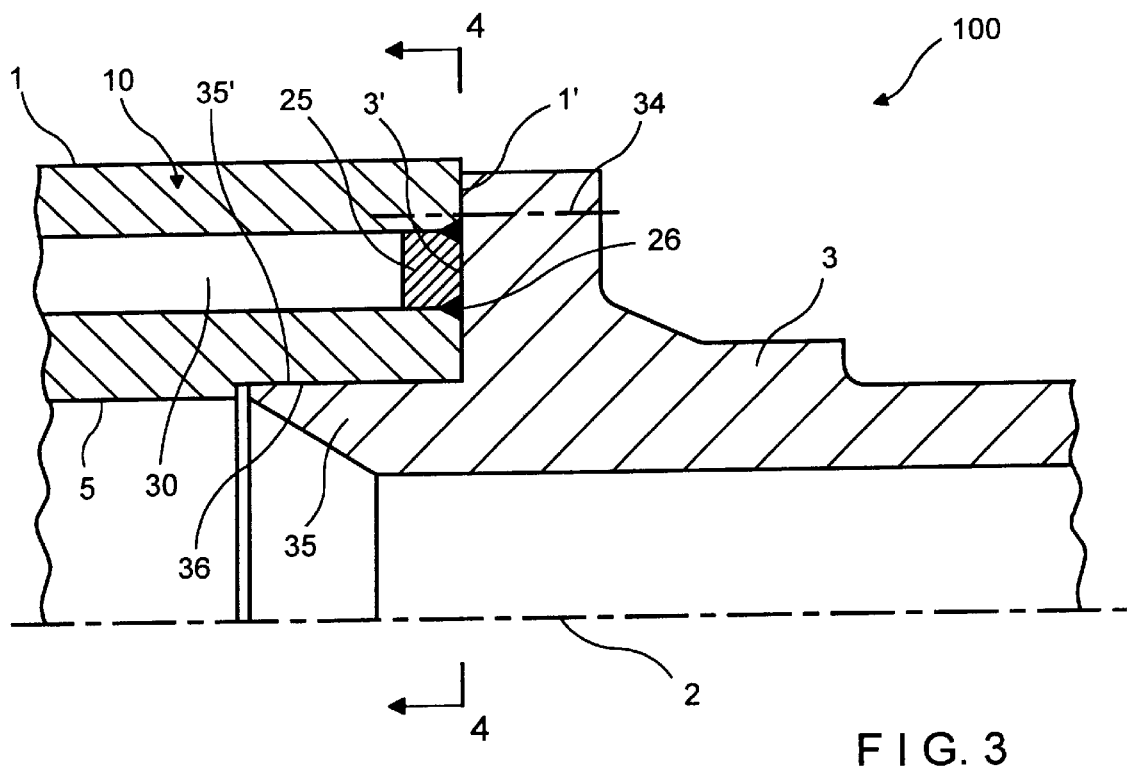
FIG. 3 shows a partial lengthwise cross-sectional view taken through an end region of a roller.

The roller, designated as a whole as 100, includes a thick-walled cylindrical roller body 10 made of steel, with a working roller outer cylindrical surface 1 and an axis 2. The body is bounded by a roller journal 3 at each of its ends, projecting to the outside, with a reduced circumference, on which bearings 4 to mount roller 100 in a machine stand or the like are arranged. Roller body 10 contains an individual cylindrical inside cavity 5 as the first cavity arrangement $H_1$, coaxial to axis 2, in which an electrical heating system, designated as a whole as 20, in the form of a radiant heating system, is arranged. In the embodiment shown, it does not rotate relative to roller body 10 but instead rotates with it. The radiant heating system 20 is made up of several (e.g. six or eight) axis-parallel electrical resistance heater rods 21, uniformly distributed over an arc of the circumference, which are supported in their reciprocal arrangement by holder disks 22 arranged at axial intervals. As illustrated in FIG. 1, the rods pass through an end disk 6 of roller 100 at the left end, where a slip ring arrangement 14 is provided on the outside, through which the current for heating heater rods 21 can be brought in. If the radiant heating system is arranged inside the roller body so as not to rotate, in accordance with another possible embodiment (not shown), and roller body 10 rotates around the radiant heating system, slip ring arrangement 14 is not necessary, and fixed connections for the heat energy can be provided. Radiant heating system 20 forms a module in and of itself, which can be pulled out to the left after end disk 6 has been removed, e.g. in the event individual heater rods 21 are defective and must be replaced. At the right end in FIG. 1, cavity 5 is closed off by a cover disk 7 which is screwed onto the face of roller journal 3 at that end. Radiant heating system 20 can be housed in the roller body without any significant design adaptation of roller body 10 and without any reduction in cross-section (inside cavity 5 is present in any case, due to the method of production), and can easily be pulled out and replaced as a whole, in case of damage. Furthermore, in comparison with oil heating, the hazards of handling very hot oil are not present in this approach.

Radiant heating system 20 heats the circumference surface of cavity 5 by radiation. The heat is transported radially to the outside by conduction and transferred to the web to be processed at outer cylindrical surface 1 of roller 100 (i.e., along the outer circumference of the roller). The aim is the most uniform possible temperature distribution at outer cylindrical surface 1, primarily in the lengthwise direction of roller 100, but also in the circumferential direction.

The uniformity of the temperature distribution can be disrupted if either heater rods 21 function unevenly or if the web absorbs different amounts of heat at different locations, for example due to non-uniform distribution of moisture.

In order to counteract any non-uniform temperature distribution, a second cavity arrangement $H_2$ is provided radially outside of cavity 5, in the form of axis-parallel bores 30 uniformly distributed over the circumference, arranged on an arc, and having the same diameter. In the illustrated embodiment, they are located radially inside of outer cylindrical surface 1 by approximately the amount of their diameter. and also leave a corresponding clearance from one another in the circumference direction. Bores 30 are each sealed at their ends and form separate channels, i.e. pressure-sealed chambers.

Bores 30 form sealed systems, partially filled with water, in which the pressure increases in accordance with the temperature prevailing at the location of the bores. In operation, if roller 100 is rotating at significant speed, water 8 comes to rest against the outer delimitations of bores 30, under the effect of centrifugal force, and forms an cylindrical inside surface 9. As soon as a lower temperature occurs at a location of the inside delimitation of bore 30 which is free of water, the steam will condense there and bring the temperature at the location in question back up. Water 8 in partially filled bores 30 therefore acts as an automatic temperature equalizer.

The temperature of water 8 can be detected by a thermosensor 11, which is located radially outside of inside surface 9 of water 8, and therefore in the water, when the roller is running, the signal of which is passed to one of the slip rings of slip ring arrangement 14 via a plug connection 12.

The function of bores 30 therefore is only to form a pressure-sealed space partially filled with water, and to act as a temperature equalizer. There are no heating elements in bores 30; these are located only in inside cavity arrangement $H_1$, in the form of the radiant heating system.

The drawing shows a modification with broken lines. It includes a cylindrical widening 5' of central cavity 5, present in the working area of roller circumference 1, coaxial to axis 2, which reduces the wall thickness of roller body 10 in this region, so that the heat applied to the inside circumference of roller body 10 now has to be transported by conduction over a smaller radial distance.

FIG. 3 to 6 illustrate several embodiments of the implementation of the seal at the ends of lengthwise bores 30. Here, roller journals 3 are attached to the actual cylindrical roller body 10 as separate parts.

FIG. 3 shows that lengthwise bores 30, which form the channels in cylindrical roller body 10, proceed from face 1' of roller body 10, which is perpendicular to axis 2 in each instance. Lengthwise bores 30 are all sealed with welded-in plugs 25. (The join zone, i.e. the ringshaped weld seam, is shown at 26.) Separate roller journal 3 is set against face 1' of roller body 10 with an end surface 3' which is perpendicular to the axis, and is attached there by axis-parallel screws 34, distributed over the circumference; only the location of one screw is shown in FIG. 3. Roller journal 3 has a centering collar 35 which projects axially, and makes contact with an inside circumference part 36 of roller body 10 with its outside circumference surface 35'.

Roller journal 3 therefore covers the join zones in the form of weld seams 26 towards the outside, relative to the very high pressure which prevails in lengthwise bores 30 at working temperatures, so that if one of the weld seams fails, no parts will be ejected towards the outside.

Figure 5:
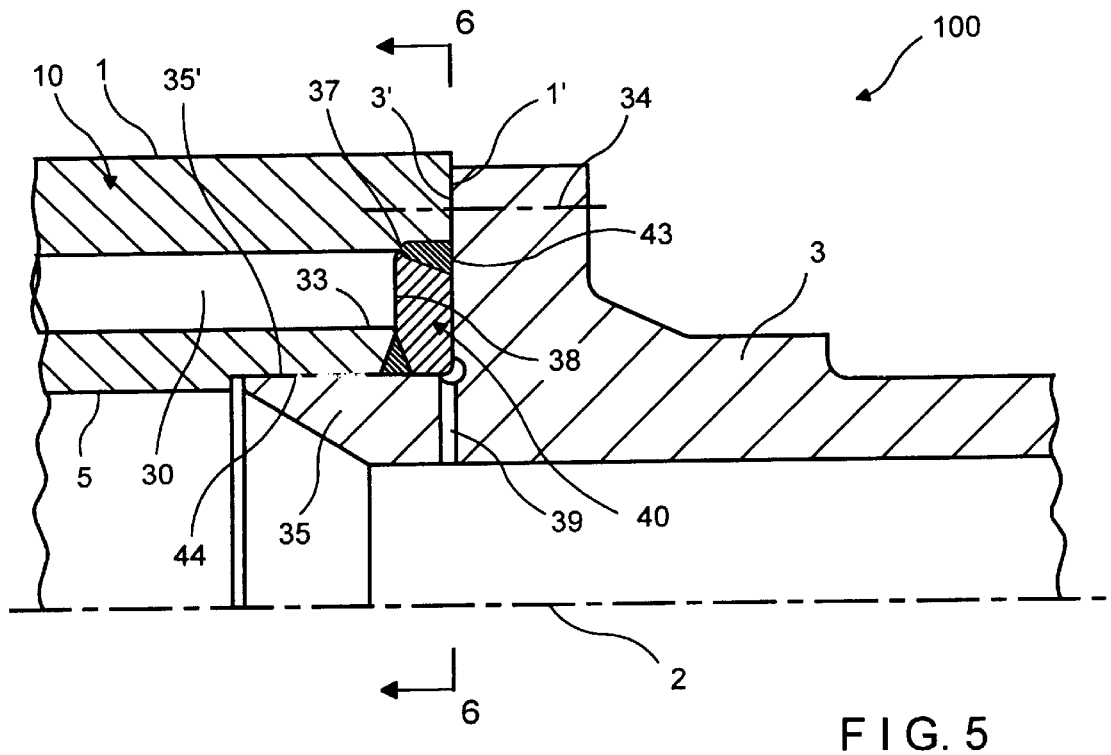
FIGS. 5 and 6 show corresponding views of a alternative embodiment.
Figure 6:
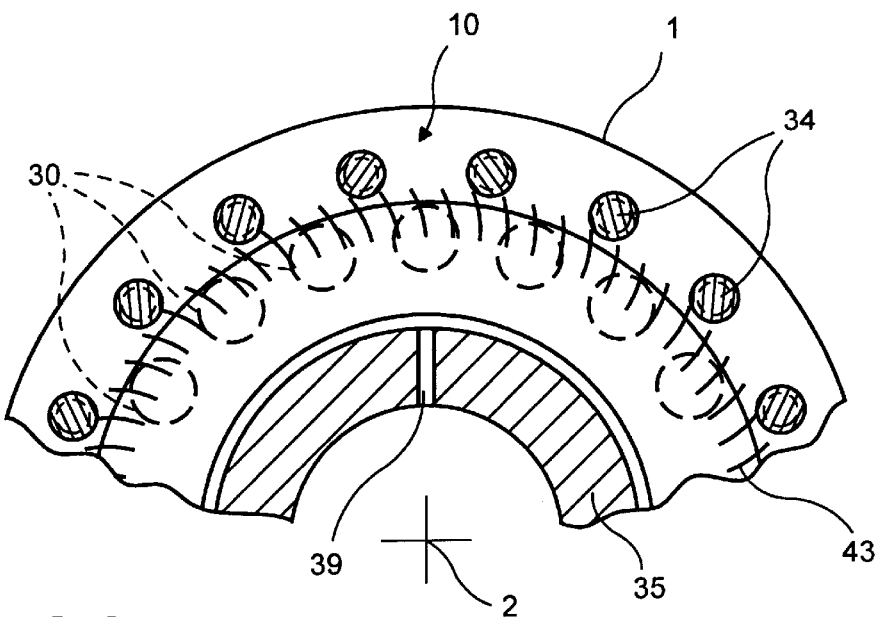

In the embodiment according to FIG. 5 and 6, a stepped inside shoulder with a cylindrical outside wall part 37, and a shoulder-like wall part 38 which projects to the inside, perpendicular to axis 2, are machined into face 1' of roller body 10. Lengthwise bores 30 are made in shoulder-like wall part 38, which therefore extends over the entire cross-section of lengthwise bores 30. After lengthwise bores 30 have been completed, a sealing ring 40 is welded in, which is approximately rectangular in a cross-section that passes through the axis, fills the inside shoulder and seals lengthwise bores 30 at the end in question. Sealing ring 40 is welded to the outer edge of cylinder surface 37 and/or the inside edge of wall part 38 at its two edges, by weld seams 43, 44.

Figure 4:
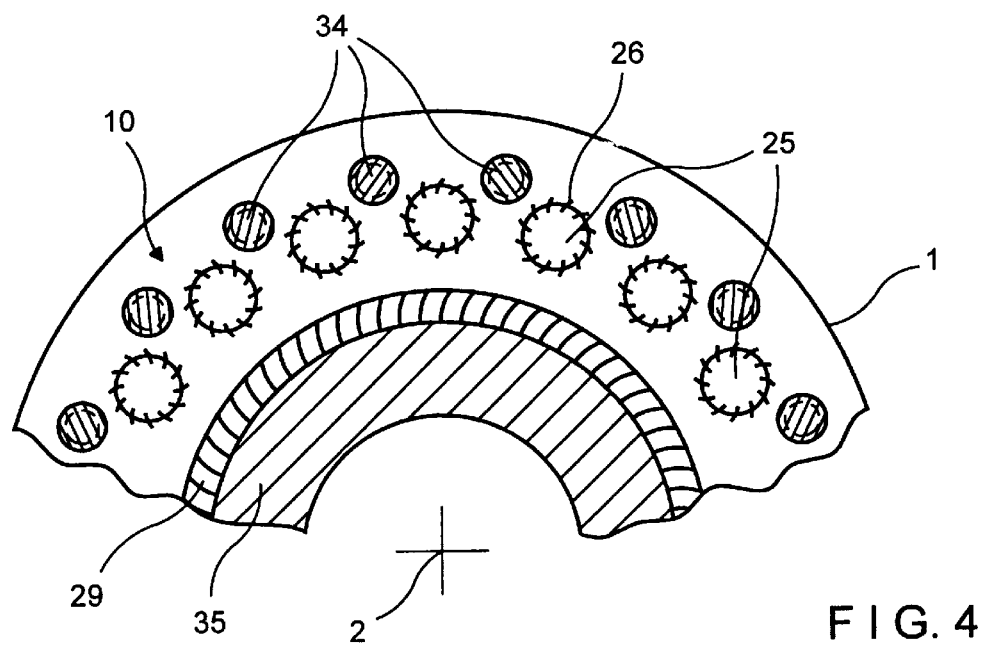
FIG. 4 shows a view taken along line IV—IV in FIG. 3.

The join zone formed by weld seams 43, 44 is covered in the same manner as in the exemplary embodiment of FIG. 3 and 4, by end surface 3' which is perpendicular to axis 2, and outside circumference 35' of centering collar 35. 39 is a pressure relief bore which proceeds from the peak between end surface 3' and outside circumference 35' of centering collar 35, in the manner shown in the drawing.

What is claimed is:

1. A heated roller, comprising:
    a cylindrical roller body having an axis about which it can rotate, the roller body having an outer cylindrical working surface axially extending along a working width;
    a first cavity located inside the roller body;
    an electrical radiant heating system inside the first cavity and extending lengthwise over the length of the roller over at least the working width of the roller; and a second cavity arrangement of several elongated channels extending along axes parallel to the axis of the roller body, the elongated channels being separate from one another, and evenly distributed over a circumferentially extending arc of the roller body, wherein the channels have ends at which they are sealed and wherein the channels are partially filled with a fluid that evaporates at the temperature produced by the heating system.

2. A roller as set forth in claim 1, wherein the channels are sealed at their ends by plugs inserted into the channels in the vicinity of axial ends of the roller body.

3. A roller as set forth in claim 1, wherein the channels are commonly sealed axially towards the outside of the roller body at at least one axial end of the roller body by a sealing ring.

4. A roller as set forth in claim 2, wherein the plugs are welded along their join zones.

5. A roller as set forth in claim 3, wherein the sealing ring is welded along its join zones.

6. A roller as set forth in claim 2, wherein a roller journal is affixed at each of the ends of the cylindrical roller body, covering welds by which the channels are sealed.

7. A roller as set forth in claim 6, wherein the roller journal includes an end surface which is perpendicular to the axis of the roller body and abuts against the face of the roller body, and has a cylindrical centering projection which engages into the end of the cylindrical roller body.

8. A roller as set forth in claim 1, wherein the heating device is configured to rotate with the roller body, and the roller comprises at least one rotary connection for providing energy to the heating device.

9. A roller as set forth in claim 1, wherein the heating device is configured not to rotate along with the roller body, but is mounted so that the cavity rotates around it.

* * * * *